United States Patent
Moore

(10) Patent No.: US 7,134,053 B1
(45) Date of Patent: Nov. 7, 2006

(54) METHOD AND APPARATUS FOR DYNAMIC PERFORMANCE EVALUATION OF DATA STORAGE SYSTEMS

(75) Inventor: Robert B Moore, Sunnyvale, CA (US)

(73) Assignee: Apple Computer, Inc., Cupertino, CA (US)

( * ) Notice: Subject to any disclaimer, the term of this patent is extended or adjusted under 35 U.S.C. 154(b) by 656 days.

(21) Appl. No.: 10/303,121

(22) Filed: Nov. 22, 2002

(51) Int. Cl.
*G06F 11/00* (2006.01)

(52) U.S. Cl. .......... 714/47; 702/182; 725/92; 725/145

(58) Field of Classification Search .......... 714/47; 702/186, 182; 725/87, 91, 92, 145
See application file for complete search history.

(56) References Cited

U.S. PATENT DOCUMENTS

| | | | | |
|---|---|---|---|---|
| 5,623,598 A | * | 4/1997 | Voigt et al. | 714/47 |
| 5,953,689 A | * | 9/1999 | Hale et al. | 702/186 |
| 6,263,298 B1 | * | 7/2001 | Kerman et al. | 702/186 |
| 6,606,585 B1 | * | 8/2003 | Borowsky et al. | 703/2 |
| 2002/0103969 A1 | * | 8/2002 | Koizumi et al. | 711/114 |
| 2004/0024900 A1 | * | 2/2004 | Breiter et al. | 709/231 |
| 2004/0103189 A1 | * | 5/2004 | Cherkasova et al. | 709/224 |

OTHER PUBLICATIONS

Tobagi, Fouad A., Joseph Pang, Randall Baird, Mark Gang, Streaming RAID—A Disk Array Management System for Video Files, No date available, Starlight Networks, Inc.*
Computer Dictionary, 1997, Microsoft Press, Third Edition, p. 121.*

* cited by examiner

*Primary Examiner*—Bryce P. Bonzo
*Assistant Examiner*—Marc Duncan
(74) *Attorney, Agent, or Firm*—Beyer Weaver & Thomas, LLP

(57) ABSTRACT

Improved approaches for evaluating performance of data storage systems used with computers are disclosed. The performance evaluation of the data storage systems utilizes dynamic performance evaluation by use of data throughput as a diagnostic. The data storage systems include, for example, either disk drives or RAIDs. In one embodiment, the invention identifies a sustained performance rate for a disk drive or RAID.

33 Claims, 5 Drawing Sheets

US 7,134,053 B1

METHOD AND APPARATUS FOR DYNAMIC PERFORMANCE EVALUATION OF DATA STORAGE SYSTEMS

BACKGROUND OF THE INVENTION

1. Field of the Invention

The present invention relates generally to data storage systems for use with computers and, more particularly, to performance evaluation of data storage systems used with computers.

2. Description of the Related Art

Disk drives are commonly used with computers, including desktop computers, notebook computers and servers, to store data. Over the years disk drives have become more advanced so as to offer greater performance and storage capacity. Manufacturers of disk drives provide data sheets or specifications that detail performance and capacity of their disk drives. However, once manufactured, computer companies may want to examine the performance of the disk drives in more detail or in specific applications.

Conventionally, a computer company would either assume that the disk drives are satisfactory given the manufacturer provided performance guarantees, or they perform their own performance testing of the disk drives. Typical testing by computer companies is table-driven, meaning that a table of manufacturer-specific performance data is needed to evaluate the disk drives. One problem with such testing is that different tables would be needed as different disk drives are tested. Such tables are not always readily available. Further, the need for various different tables is cumbersome to those having to perform the testing. Another problem with such testing is that it is dependent on the table data, which is normally provided by the manufacturer, and thus is not necessarily provided for serious performance testing. Still another problem with such testing is that disk drives typically report hard errors but do not report soft errors (i.e., recovered errors). For example, in reading data, if the disk drive initially has an error (i.e., soft error) but on a re-read is able to recover the data correctly, then no error is reported. However, the performance of the disk drive during such read operation is diminished because additional revolutions are required to re-read the data. Each additional revolution causes a performance penalty on the order of seven (7) milliseconds with today's technology.

Thus, there is a need for improved approaches to test performance of disk drives.

SUMMARY OF THE INVENTION

Broadly speaking, the invention relates to improved approaches for evaluating performance of a data storage system used with computers. The performance evaluation of the data storage system utilizes dynamic performance evaluation by use of data throughput as a diagnostic. The data storage system includes, for example, either at least one disk drive or a Redundant Array of Inexpensive Disks (RAID). In one embodiment, the invention identifies a sustained performance rate for a disk drive or RAID.

The invention can be implemented in numerous ways, including as a method, system, device, apparatus, or computer readable medium. Several embodiments of the invention are discussed below.

As a method for evaluating performance of a RAID for streaming data, one embodiment of the invention includes at least the acts of: identifying a configured RAID including at least a plurality of disk drives; evaluating data transfer performance of the disk drives of the configured RAID; comparing the data transfer performance with minimum performance criteria; and certifying the configured RAID as suitable for streaming data when the data transfer performance of the disk drives of the configured RAID exceeds the minimum performance criteria.

As a method for evaluating performance of a RAID having a plurality of disk drives for streaming data, one embodiment of the invention includes at least the acts of: producing an average transfer time for at least one of the disk drives; transferring a first number of data blocks from one of the disk drives; determining a measured transfer time for the time it takes to transfer the first number of data blocks from the one of the disk drives; determining whether the measured transfer time is substantially greater than the average transfer time; and increasing a performance error count when the measured transfer time is substantially greater than the average transfer time.

As a method for evaluating performance of a disk drive, one embodiment of the invention includes at least the acts of: obtaining an average transfer time for the disk drive; transferring a first number of data blocks from the disk drive; determining a measured transfer time for the time it takes to transfer the first number of data blocks from the disk drive; determining whether the measured transfer time is substantially greater than the average transfer time; and increasing a performance error count when the measured transfer time is substantially greater than the average transfer time.

As a server for streaming data, one embodiment of the invention includes at least a plurality of disk drives and a drive controller for the disk drives. The drive controller operates to control operation of the disk drives, obtain data transfer time performance of each of the disk drives, compare the data transfer time performance of each of the disk drives with minimum performance requirements, and certify suitability of the disk drives for use in streaming data when it is determined that the data transfer time performance of each of the disk drives meets or exceeds the minimum performance requirements. According to one implementation, the disk drives are configured into a RAID and the drive controller serves as a RAID controller.

As a computer readable medium including at least computer program code for evaluating performance of a RAID having a plurality of disk drives for streaming data, one embodiment of the invention includes at least: computer program code for producing an average transfer time for at least one of the disk drives; computer program code for transferring a first number of data blocks from one of the disk drives; computer program code for determining a measured transfer time for the time it takes for the first number of data blocks to be transferred from the one of the disk drives; computer program code for determining whether the measured transfer time is substantially greater than the average transfer time; and computer program code for increasing a performance error count when it is determined that the measured transfer time is substantially greater than the average transfer time.

Other aspects and advantages of the invention will become apparent from the following detailed description, taken in conjunction with the accompanying drawings, illustrating by way of example the principles of the invention.

BRIEF DESCRIPTION OF THE DRAWINGS

The invention is illustrated by way of example, and not by way of limitation, in the figures of the accompanying drawings and in which like reference numerals refer to similar elements and in which.

DETAILED DESCRIPTION OF THE INVENTION

The invention relates to improved approaches for evaluating performance of a data storage system used with computers. The performance evaluation of the data storage system utilizes dynamic performance evaluation by use of data throughput as a diagnostic. The data storage system includes, for example, either at least one disk-drive or a Redundant Array of Inexpensive Disks (RAID). In one embodiment, the invention identifies a sustained performance rate for a disk drive or RAID.

Disk drives are used for many purposes. Data throughput rate for disk drives can be important for certain applications. In the case of a RAID that makes use of disk drives, the ability of the RAID to provide adequate data throughput is dependent on the performance of its disk drives. Hence, although a disk drive might operate to correctly store and read data, the disk drive might have an inadequate performance. For example, a disk drive that frequently has to recover from soft errors will normally have a slowed performance, referred to as a slow error performance. In certain applications where data throughput is important, slow error performance would be unacceptable. For example, in the case of streaming data (e.g., audio or video data), time performance is of particular concern because if a data stream is temporarily delayed, the recipient of the data stream receives no data during the delay and thus causes slow spots, jitter or other undesired artifacts to occur in the presentation of the data. Accordingly, it is useful to provide improved disk drive performance evaluation so as to be able to identify those disk drives that have slow error performance. Such performance evaluation can, for example, be in view of application-specific criteria.

Embodiments of the invention are discussed below with reference to FIGS. 1–4. However, those skilled in the art will readily appreciate that the detailed description given herein with respect to these figures is for explanatory purposes as the invention extends beyond these limited embodiments.

Figure 1:
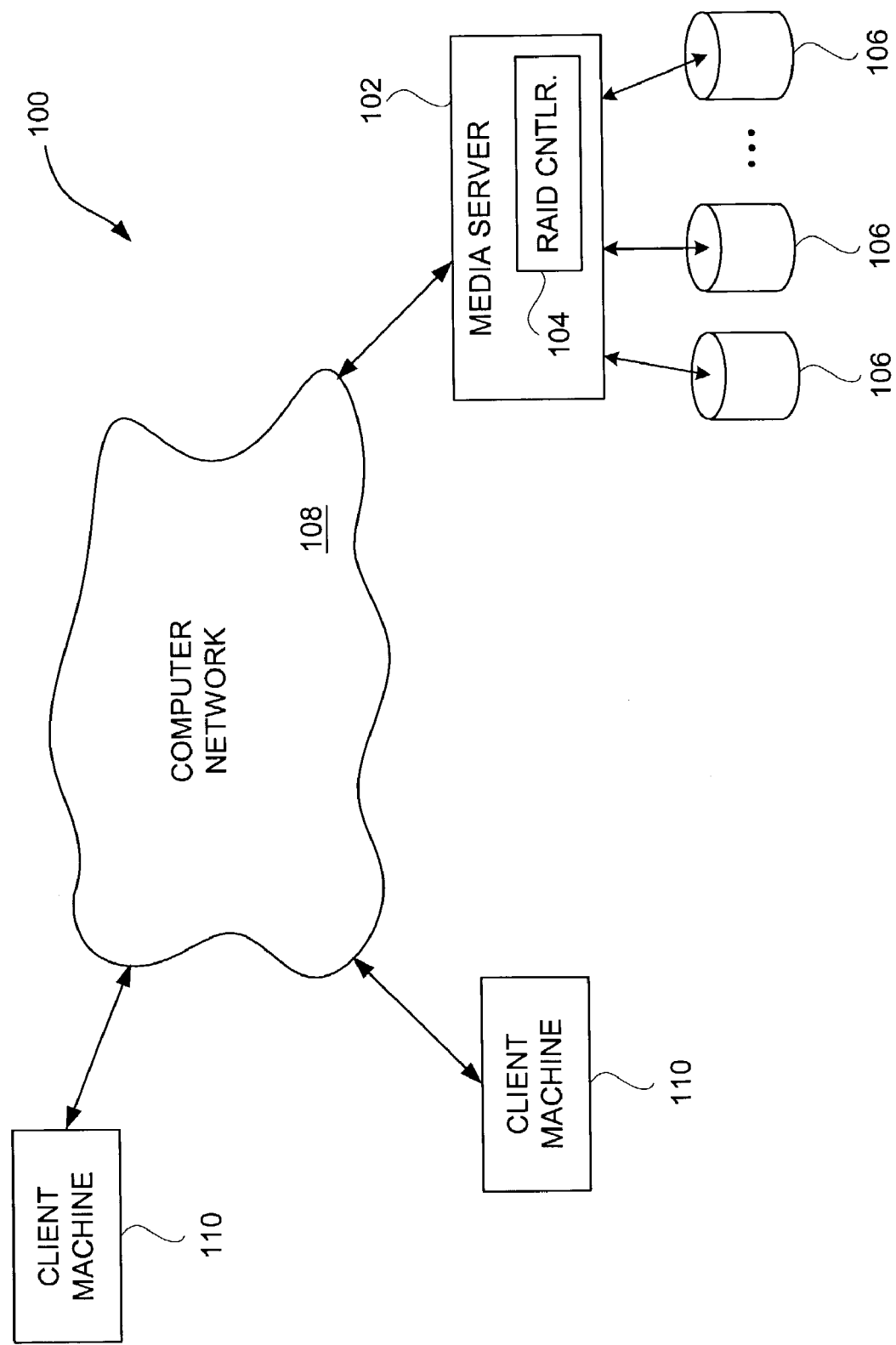
FIG. 1. is a block diagram of a media streaming system according to one embodiment of the invention.

FIG. 1. is a block diagram of a media streaming system 100 according to one embodiment of the invention. The media streaming system 100 includes a media server 102 that stores media which is able to be requested and delivered over a network. The media server 102 incorporates or couples to a RAID which provides storage for the media.

The media server 102 can include a RAID controller 104. Alternatively, the RAID controller 104 could be separate from but operatively coupled to the media server 102. The RAID controller 104 controls the operation of the RAID. In other words, the RAID controller 104 controls storage of data to and retrieval of data from the RAID. The RAID controller 104 also understands the configuration and storage pattern of the media on the RAID. The RAID is represented by a plurality of disk drives 106.

In one embodiment, the media server 102 serves to stream media stored in the RAID to remote requesters. The RAID controller 104 determines in accordance with a RAID configuration which of the disk drives 106 are to be included within a RAID configuration that is used to supply media to the media server 102 which in turn streams the media to remote requesters. The media server 102 couples to a computer network 108. The computer network is an interconnection of a plurality of computers. For example, the computer network 108 can be an intranet or the Internet. The media streaming system 100 is able to stream the media to the remote requestors, namely, one or more client machines 110 that couple to the computer network 108. The various client machines 110 that receive the streaming of the media can do so via a common stream or separate streams.

According to the invention, when the RAID controller 104 sets a RAID configuration, the plurality of disk drives 106 that are included within the particular RAID configuration can be performance tested to ensure minimum performance with respect to transferring data therefrom. Data transfer performance is particularly important in a media streaming environment.

When the RAID configuration is deemed to have sufficient transfer performance, then the RAID configuration can then be certified as appropriate for media streaming. On the other hand, when the RAID configuration is determined to be unsatisfactory in terms of transfer performance, the RAID configuration would not be certified. In the case in which a RAID configuration is not certified, a different configuration for the RAID can be selected and the process repeated to determine whether the new, different configuration for the RAID is able to be certified. Given that different disk drives have different performances, even those specified by the manufacturer to have essentially the same ratings, these performance differences can introduce defects or problems in the case of media streaming in which consistent data transfer (e.g., reads) are important.

Figure 2:
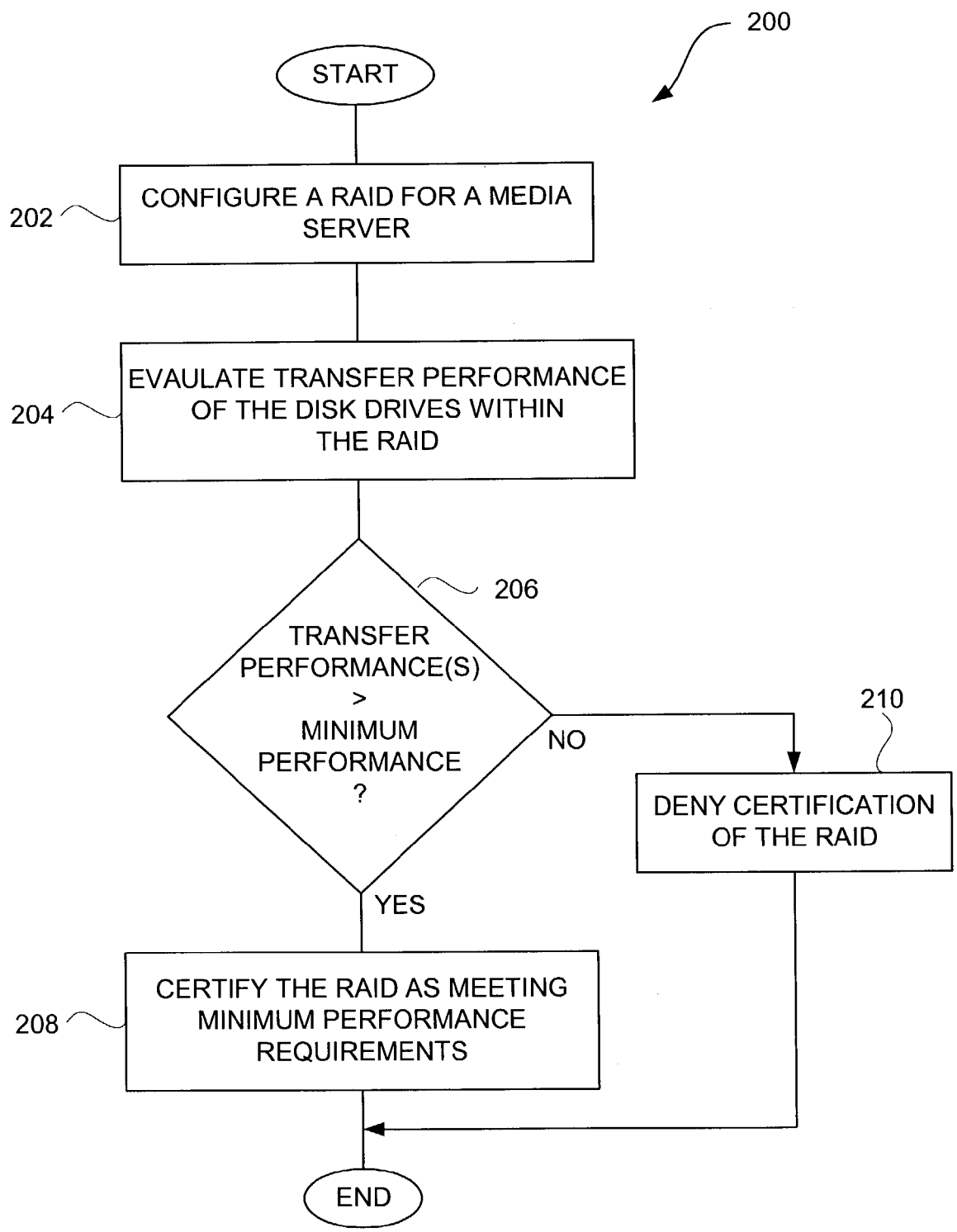
FIG. 2 is a flow diagram of a RAID performance monitoring process according to one embodiment of the invention.

FIG. 2 is a flow diagram of a RAID performance monitoring process 200 according to one embodiment of the invention. The RAID performance monitoring process 200 is, for example, performed by the RAID controller 104 (or the media server 102) illustrated in FIG. 1.

The RAID performance monitoring process 200 initially configures 202 a RAID for a media server. Such a configuration can be automatically performed or performed by a user interacting with a graphical user interface. Typically, a RAID controller, such as the RAID controller 104 illustrated in FIG. 1, is used to implement the configuration of the RAID.

After the RAID has been configured 202, transfer performance of the disk drives within the RAID are evaluated 204. In one embodiment, the transfer performance is individually performed on each of the disk drives within the RAID. In another embodiment, the transfer performance is evaluated for the RAID as a whole. Preferably, however, the transfer performance is evaluated on a disk drive by disk drive basis so that slow performance of a particular disk drive can serve to eliminate that disk drive from the RAID configuration and thus allow the other disk drives within the RAID configuration to remain if their performance is acceptable.

A decision 206 then determines whether the transfer performance for each of the disk drives (or a single transfer performance for the plurality of disk drives within the RAID) is greater than a minimum performance. The minimum performance can be set to a fixed performance criteria.

For example, the minimum performance can be set to a predetermined minimum transfer time. The minimum performance can also vary depending on the type of application the RAID is to be used in or the type of media being streamed. Hence, when the decision 206 determines that the transfer performance is greater than the minimum performance, then the RAID is certified 208 as meeting the minimum performance requirements. In one embodiment, the minimum performance requirements are associated with application of the RAID to a media streaming environment. When the RAID is able to be certified 208, the disk drives used in the RAID configuration are able to satisfy the minimum performance requirements for the media streaming environment.

Alternatively, when the decision 206 determines that the transfer performance is not greater than the minimum performance, then the certification of the RAID is denied 210. Here, the RAID configuration includes one or more disk drives (or the RAID itself) that fail to satisfy the minimum performance requirements. Hence, the RAID is not able to be certified as suitable for use in media streaming. Following the operations 208 and 210, the RAID performance monitoring process 200 is complete and ends.

Figure 3A:
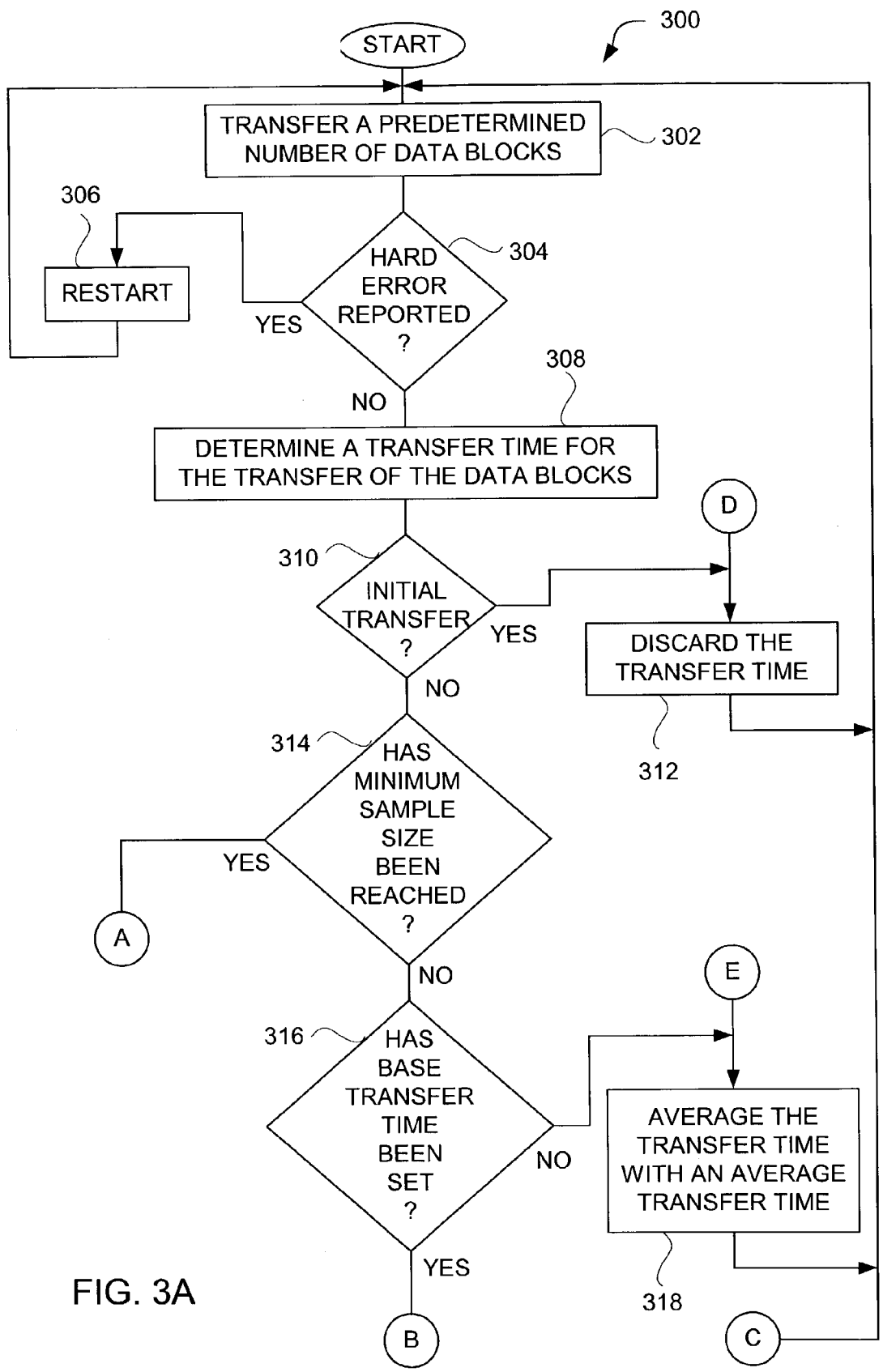
FIGS. 3A–3C are flow diagrams of data transfer performance monitoring according to one embodiment of the invention.
Figure 3B:
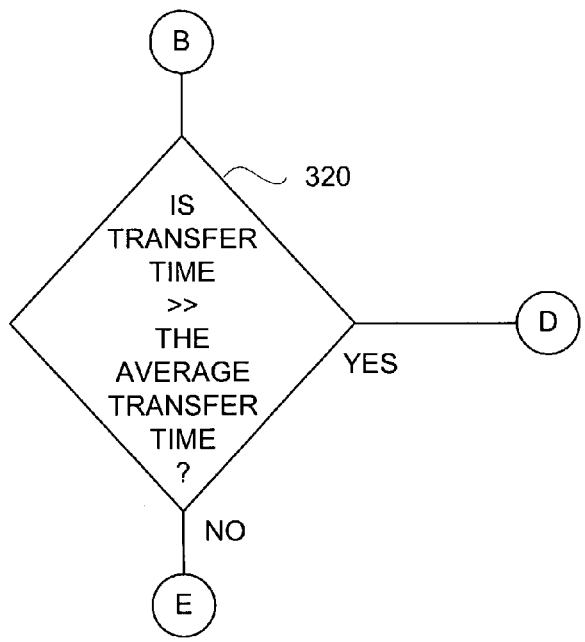
Figure 3C:
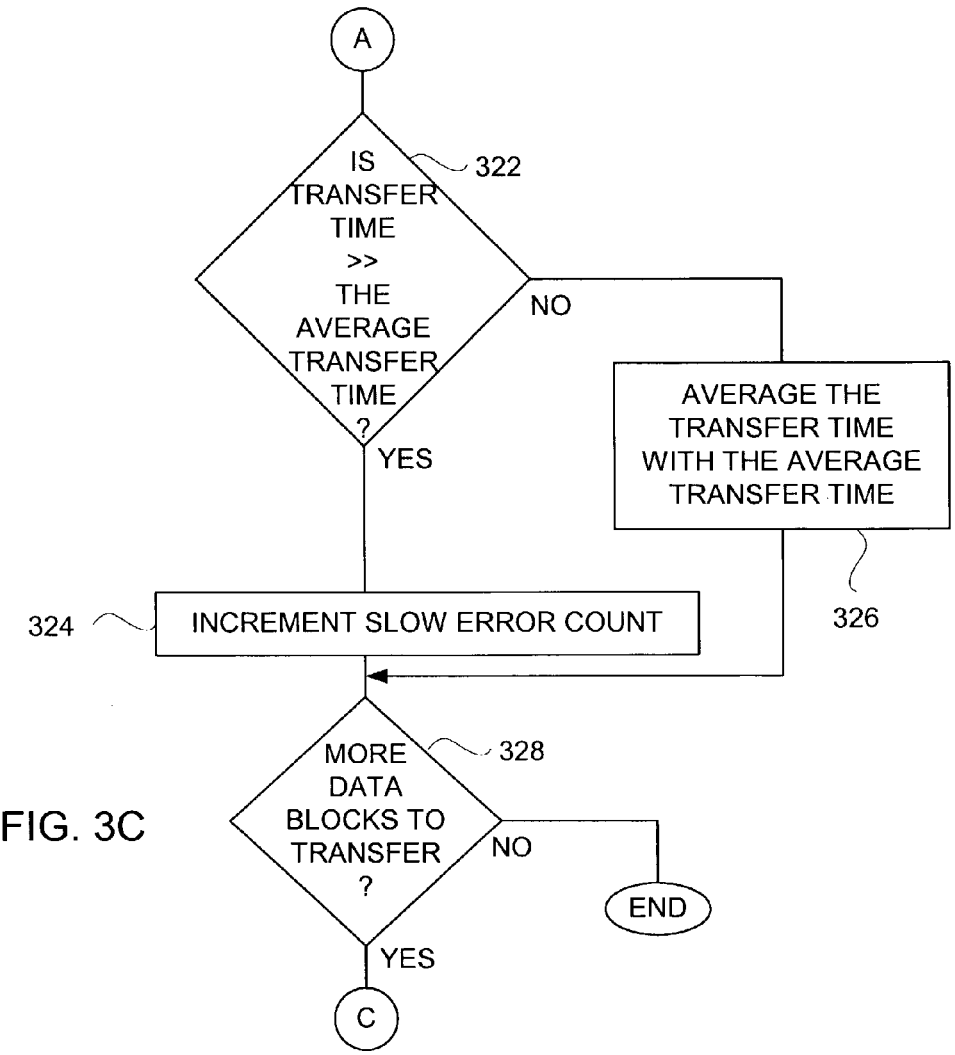

FIGS. 3A–3C are flow diagrams of data transfer performance monitoring 300 according to one embodiment of the invention. The data transfer performance monitoring 300 represents processing performed to evaluate a disk drive. In one application, the disk drive being evaluated is associated with a RAID configuration. As an example, the data transfer performance monitoring 300 is suitable for use as processing to be performed in operation 204 of FIG. 2.

The data transfer performance monitoring 300 initially transfers a predetermined number of data blocks. In one embodiment, a data block represents the smallest amount of data (e.g., 512 bytes) that can be transferred, namely, read, from a disk drive. The predetermined number of such data blocks can vary with application. For example, the predetermined number can be 100, 200 or 256. In transferring the predetermined number of data blocks, a decision 304 determines whether a hard error is reported. The disk drive (e.g., its controller) will report a hard error when the disk drive is unable to correctly read a block of data. In the case in which the decision 304 determines that a hard error has been reported, then the data transfer performance monitoring 300 is restarted 306 with another disk drive, as the current drive is deemed unacceptable. When the predetermined number of data blocks are able to be transferred 302 without any hard errors, then a transfer time for the transfer of the data blocks is determined 308. Simply put, the transfer time is the duration of time it takes to transfer the predetermined number of data blocks from the selected disk drive.

After the transfer time has been determined 308, a decision 310 determines whether the transfer of the predetermined number of data blocks currently being processed is an initial transfer. When the decision 310 determines that the transfer is an initial transfer, then the transfer time is discarded 312 and processing returns to repeat the beginning of the data transfer performance monitoring 300 so that an another predetermined number of data blocks can be transferred and processed. In this case, the initial transfer is deemed to be inaccurate of a typical data transfer because various overhead delays cause the transfer time to be substantially greater than a steady state data transfer time.

On the other hand, when the decision 310 determines that the data transfer is not the initial transfer, then a decision 314 determines whether a minimum sample size has been reached. The minimum sample size represents a number of transfers of the predetermined number of data blocks that are to be processed before the system begins to categorize data performance of disk drives. As an example, in one implementation, the minimum sample size can be ten-thousand (10,000) samples. In other implementations, the minimum sample size can vary widely. In one embodiment, the goal of the minimum sample size is to reduce the effect of spurious slow transfers on generation of a base transfer time.

When the decision 314 determines that the minimum sample size has not yet been reached, a decision 316 determines whether a base transfer time has been set. The base transfer time represents the transfer time associated with a base number of transfers. As an example, the number of transfers included within the base transfer can be one-hundred (100). When the decision 316 determines that the base transfer time has not yet been set, then the transfer time that was determined in operation 308 is averaged 318 together with an average transfer time. In other words, the average transfer time is a running average of the transfer times that are determined 308 (unless discarded). Following the averaging 318 of the transfer time with other prior transfer times, the data transfer performance monitoring 300 returns to repeat the operation 302 and subsequent operations so that another transfer of the predetermined number of data blocks can be processed.

Alternatively, when the decision 316 determines that the base transfer time has been set, such as after 100 transfers have been averaged, a decision 320 can determine whether the transfer time (associated with the predetermined number of data blocks currently being transferred) is much greater than the average transfer time. In one embodiment, the transfer time can be deemed much greater than the average transfer time when the transfer time is more than twice the average transfer time. Hence, when the decision 320 determines that the transfer time is much greater than the average transfer time, then the transfer time is discarded 312 and the processing returns to repeat the operation 302 and subsequent operations. Here, the discarding of the transfer time is used to maintain the accuracy of the average transfer time such that a transfer time that is out of line with the average transfer time is not averaged in with the average transfer time. The discarding in this case preserves the accuracy of the average transfer time so that the average is not skewed. On the other hand, when the decision 320 determines that the average transfer time is not much greater than the average transfer time, then the transfer time is averaged 318 in with the average transfer time and the processing returns to repeat the operation 302 so that a next transfer of the predetermined number of blocks can be similarly processed.

On the other hand, when the decision 314 determines that the minimum sample size has been reached, then the evaluation of the data transfer performance of the disk drive can be evaluated with respect to the average transfer time that has been produced. More particularly, when the decision 314 determines that the minimum sample size has been reached, a decision 322 determines whether the transfer time that has been determined at operation 308 is much greater than the average transfer time. In one embodiment, the transfer time can be deemed much greater than the average transfer time when the transfer time is twice that of the average transfer time. In another embodiment, the transfer time can be deemed much greater than the average transfer time when the transfer time is one and a one-half times that of average transfer time.

When the decision 322 determines that the transfer time is much greater than the average transfer time, then a slow error count for the disk drive being examined is incremented

324. Alternatively, when the decision 322 determines that the transfer time is not much greater than the average transfer time, then the transfer time that was determined at operation 308 is averaged 326 in with the average transfer time. Here, by averaging the transfer time into the average transfer time, the average transfer time is further increased with respect to its accuracy. Alternatively, however, the operation 326 could discard the transfer time so that the transfer time is not included within the average transfer time.

In any case, following the operations 324 and 326, a decision 328 determines whether there are more data blocks to transfer. Typically, the data transfer performance monitoring 300 is performed for a particular disk drive within a RAID configuration. The data transfer performance monitoring 300 transfers data from each data block of the disk drive. Hence, in one embodiment, the decision 328 can thus determine whether all the data blocks on the disk drive have been processed through transferring the data therefrom. Accordingly, when the decision 328 determines that there are other data blocks to be transferred, then the data transfer performance monitoring 300 returns to repeat the operation 302 and subsequent operations so that the remaining data blocks are able to be processed. Alternatively, when the decision 328 determines that there are no more data blocks on the disk drive to be processed, then the data transfer performance monitoring 300 is complete and ends.

In one embodiment an average transfer time is computed each time for each drive. In an alternative embodiment, an average transfer time can be compute for a particular type and manufacturer drive and then re-used when evaluating data transfer performance of all such like drives. However, with the alternative embodiment, one needs to be wary of possible differences in performance of such like drives that result due to variations in drive configuration.

Figure 4:
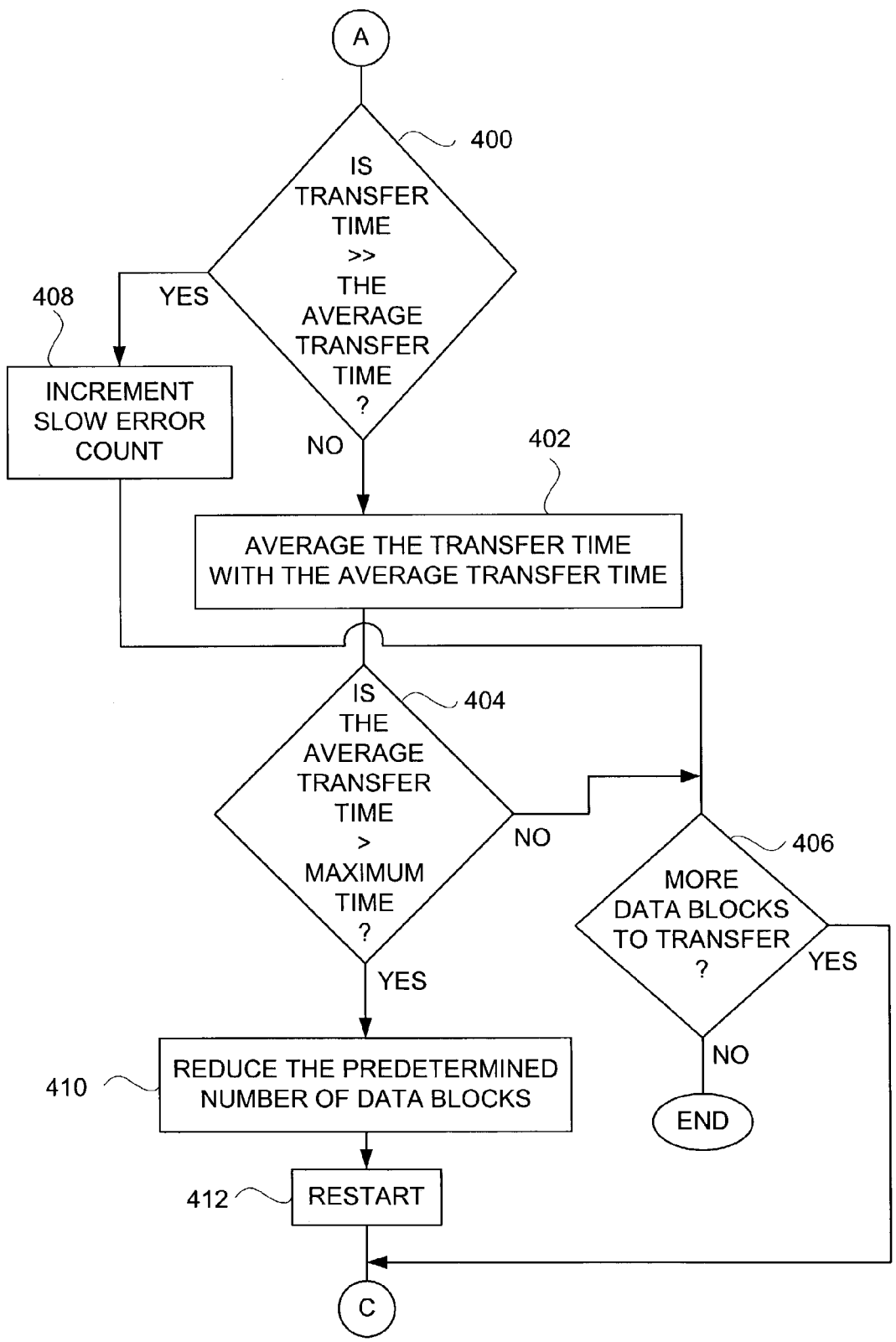
FIG. 4 represents a flowchart of alternate processing that can be performed in place of the processing illustrated in FIG. 3C.

FIG. 4 represents a flowchart of alternate processing that can be performed in place of the processing illustrated in FIG. 3C. In accordance with the embodiment shown in FIG. 4, when the minimum sample size has been reached (as determined at operation 314 of FIG. 3A), a decision 400 can determine whether the transfer time is much greater than the average transfer time. In one embodiment, the transfer time can be deemed much greater than the average transfer time when the transfer time is twice that of the average transfer time. In another embodiment, the transfer time can be deemed much greater than the average transfer time when the transfer time is one and a one-half times that of the average transfer time. In any case, when the decision 400 determines that the transfer time is not much greater than the average transfer time, then the transfer time is averaged 402 in with the average transfer time. Alternatively, the operation 402 could discard the transfer time and not use it to further enhance the average transfer time. Following the operation 402, a decision 404 determines whether the average transfer time is greater than a maximum time. Here, the decision 404 determines whether the average transfer time has become too large, such that the resolution provided by the average transfer time is inadequate. Hence, when the average transfer time is determined 404 to be greater than the maximum time, then the predetermined number of data blocks is reduced 410. By reducing the predetermined number of data blocks associated with a transfer, the average transfer time is likewise reduced such that the resolution of the average transfer time improves. For example, the slow performance of disk drives is often caused by misses or retries that each consume several (e.g., 7) milliseconds. Hence, as the average transfer time becomes too large, the detection of the several millisecond delays is easily lost. Hence, the reduction 410 of the predetermined number of blocks serves to decrease the average transfer time such that the resolution is enhanced so that delays on the order of several milliseconds are apparent. After the predetermined number of data blocks have been reduced 410, the data transfer performance monitoring 300 is restarted 412 and processing returns to repeat the operation 302 shown in FIG. 3A and subsequent operations, using the now-reduced predetermined number of data blocks for each transfer.

Alternatively, when the decision 400 determines that the transfer time is much greater than the average transfer time, then a slow error count is incremented 408. The slow error count represents a count of the number of times that the transfer time for a predetermined number of data blocks has been deemed slow. Typically, the slow error count is eventually used to determine whether the disk drive being evaluated has slow performance. In any case, following the operation 408, as well as following the decision 404 when the average transfer time is not greater than a maximum time, a decision 406 determines whether there are more data blocks to be transferred. Here, the decision 406 determines whether all the data blocks of a disk drive have been processed in evaluating the performance of the disk drive. When the decision 406 determines that there are more data blocks to be transferred, then the processing returns to repeat the operation 302 shown in FIG. 3A and subsequent operations so that additional data blocks can be processed. Alternatively, when the decision 406 determines that there are no more data blocks to be transferred, then the evaluation of the performance of the disk drive is completed and thus the processing ends.

In one embodiment, the slow error count managed by the processing in operation 324 of FIG. 3C or the operation 408 in FIG. 4 can be used by the decision 206 in FIG. 2 to determine whether the RAID configuration of disk drives can be certified as meeting minimum performance requirements. In such an embodiment, the decision 206 illustrated in FIG. 2 can compare the slow error count for a given disk drive with a minimum performance criteria. For example, the minimum performance criteria can be a number of permissible slow error counts for a given disk drive. When the decision 206 determines that the slow error count for a given disk drive exceeds the number of permissible slow error counts for a disk drive, then the disk drive is deemed to have insufficient performance. Consequently, the RAID including the disk drive is unable to be certified (operation 210, FIG. 2). In one embodiment, the number of permissible slow error counts can depend upon the size of the disk drive. For example, up to 20 slow errors can be permissible in a 20 Gigabyte disk drive, whereas up to 40 slow errors can be permissible in a 40 Gigabyte disk drive.

The various aspects or features of the invention described above can be used alone or in various combinations. The invention is preferably implemented by software, but can also be implemented by hardware or a combination of hardware and software. The invention can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, optical data storage devices, and carrier waves. The computer readable medium can also be distributed over network-coupled computer systems so that the computer readable code is stored and executed in a distributed fashion.

The advantages of the invention are numerous. Different embodiments or implementations may yield one or more of the following advantages. It should be noted that this is not an exhaustive list and there may be other advantages which are not described herein. One advantage of the invention is that improved performance (e.g., data throughput) evaluation of disk drives or RAIDs is achieved. Another advantage of the invention is that suitability of disk drives or RAIDs for data streaming applications can be evaluated. Still another advantage of the invention is that performance evaluation of disk drives and RAIDs can be achieved by users of such in a diagnostic manner that uses criteria which may be independent of drive vendors or manufacturers.

The many features and advantages of the invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A method for evaluating performance of a RAID for streaming data, said method comprising:
    (a) identifying a configured RAID including at least a plurality of disk drives;
    (b) evaluating data transfer performance of the disk drives of the configured RAID;
    (c) comparing the data transfer performance with minimum performance criteria; and
    (d) certifying the configured RAID as suitable for streaming data when said comparing (c) indicates that the data transfer performance of the disk drives of the configured RAID exceeds the minimum performance criteria, wherein said evaluating (b) comprises:
        (b1) determining an average transfer time for at least one of the disk drives;
        (b2) transferring a first number of data blocks from the one of the disk drives;
        (b3) determining a measured transfer time for the time it takes for said transferring (a) to transfer the first number of data blocks from the one of the disk drives;
        (b4) determining whether the measured transfer time is substantially greater than the average transfer time;
        (b5) increasing a performance error count when said determining (b4) determines that the measured transfer time is substantially greater than the average transfer time; and
        (b6) repeating at least said transferring (b2) through said increasing (b5) for subsequent transfers of the first number of data blocks from the one of the disk drives, said repeating (b6) continuing until all the data blocks of the one of the disk drives has undergone data transfer therefrom.

2. A method as recited in claim 1, wherein the data to be streamed has a media type, and wherein the minimum performance criteria is dependent on the media type to be streamed.

3. A method as recited in claim 2, wherein the media type is audio or video.

4. A method as recited in claim 1, wherein said evaluating (b) is performed separately on each of the disk drives of the configured RAID.

5. A method as recited in claim 4, wherein said comparing (c) compares the data transfer performance for each of the disk drives of the configured RAID with the minimum performance criteria, and
    wherein said certifying (d) certifies the configured RAID only when the data transfer performance for each of the disk drives of the configured RAID exceeds the minimum performance criteria.

6. A method as recited in claim 1, wherein said evaluating (b) comprises:
    (b1) determining an average transfer time for at least one of the disk drives;
    (b2) transferring a first number of data blocks from the one of the disk drives;
    (b3) determining a measured transfer time for the time it takes for said transferring (a) to transfer the first number of data blocks from the one of the disk drives;
    (b4) determining whether the measured transfer time is substantially greater than the average transfer time;
    (b5) increasing a performance error count when said determining (b4) determines that the measured transfer time is substantially greater than the average transfer time; and
    (b6) repeating at least said transferring (b2) through said increasing (b5) for subsequent transfers of the first number of data blocks from the one of the disk drives, said repeating (b6) continuing until all the data blocks of the one of the disk drives has undergone data transfer therefrom.

7. A method as recited in claim 1, wherein said determining (b1) operates to dynamically determine the average transfer time for at least one of the disk drives through a plurality of data transfers.

8. A method as recited in claim 1, wherein the data to be streamed has a media type, and wherein the minimum performance criteria is dependent on the media type to be streamed.

9. A method as recited in claim 8, wherein the media type is audio or video.

10. A method as recited in claim 8, wherein said evaluating (b) is performed separately on each of the disk drives of the configured RAID.

11. A method as recited in claim 10, wherein said comparing (c) compares the data transfer performance for each of the disk drives of the configured RAID with the minimum performance criteria, and
    wherein said certifying (d) certifies the configured RAID only when the data transfer performance for each of the disk drives of the configured RAID exceeds the minimum performance criteria.

12. A method for evaluating performance of a RAID for streaming data, said method comprising:
    (a) identifying a configured RAID including at least a plurality of disk drives;
    (b) evaluating data transfer performance of the disk drives of the configured RAID;
    (c) comparing the data transfer performance with minimum performance criteria; and
    (d) certifying the configured RAID as suitable for streaming data when said comparing (c) indicates that the data transfer performance of the disk drives of the configured RAID exceeds the minimum performance criteria, wherein said identifying (a) comprises configuring a RAID including at least the plurality of disk drives, wherein said evaluating (b) comprises:
        (b1) determining an average transfer time for at least one of the disk drives;

(b2) transferring a first number of data blocks from one of the disk drives;

(b3) determining a measured transfer time for the time it takes for said transferring (a) to transfer the first number of data blocks from the one of the disk drives;

(b4) determining whether the measured transfer time is substantially greater than the average transfer time;

(b5) increasing a performance error count when said determining (b4) determines that the measured transfer time is substantially greater than the average transfer time; and (b6) repeating at least said transferring (b2) through said increasing (b5) for subsequent transfers of the first number of data blocks from the one of the disk drives, said repeating (b6) continuing until all the data blocks of the one of the disk drives has undergone data transfer therefrom.

13. A method as recited in claim 12, wherein said determining (b1) operates to dynamically determine the average transfer time for at least one of the disk drives through a plurality of data transfers.

14. A method for evaluating performance of a RAID having a plurality of disk drives for streaming data, said method comprising:

(a) producing an average transfer time for at least one of the disk drives, wherein said producing (a) includes at least (a1) performing a predetermined number of data transfers from the one of the disk drives; (a2) determining transfer times for each of the predetermined number of data transfers being performed by said performing (a1); and (a3) averaging the transfer times to produce the average transfer time for the one of the disk drives;

(b) transferring a first number of data blocks from one of the disk drives;

(c) determining a measured transfer time for the time it takes for said transferring (b) to transfer the first number of data blocks from the one of the disk drives;

(d) determining whether the measured transfer time is substantially greater than the average transfer time; and (e) increasing a performance error count when said determining (d) determines that the measured transfer time is substantially greater than the average transfer time.

15. A method as recited in claim 14, wherein said method further comprises:

(f) repeating at least said transferring (b) through said increasing (e) for subsequent transfers of the first number of data blocks from the one of the disk drives.

16. A method as recited in claim 15, wherein said repeating (f) continues until all the data blocks of the one of the disk drives has undergone data transfer therefrom, and wherein said method further comprises:

(g) comparing the performance error count with a maximum count; and (h) determining whether the one of the disk drives has a deficient performance when the performance error count exceeds the maximum count.

17. A method as recited in claim 16, wherein said method further comprises:

(i) repeating said producing (a) through said determining (h) for each of the other of the disk drives of the RAID.

18. A method as recited in claim 17, wherein said method further comprises:

(j) determining that the RAID is inadequate to stream data when one or more of the disk drives of the RAID are determined to have a deficient performance.

19. A method as recited in claim 14, wherein said producing (a) is done empirically by measuring a transfer time over a sample size.

20. A method for evaluating performance of a RAID having a plurality of disk drives for streaming data, said method comprising:

(a) producing an average transfer time for at least one of the disk drives, wherein said producing (a) includes at least (a1) performing a predetermined number of data transfers from the one of the disk drives; (a2) determining transfer times for each of the predetermined number of data transfers being performed by said performing (a1); (a3) discarding at least one of the transfer times; and (a4) averaging the transfer times that have not been discarded to produce the average transfer time for the one of the disk drives;

(b) transferring a first number of data blocks from one of the disk drives;

(c) determining a measured transfer time for the time it takes for said transferring (b) to transfer the first number of data blocks from the one of the disk drives;

(d) determining whether the measured transfer time is substantially greater than the average transfer time; and (e) increasing a performance error count when said determining (d) determines that the measured transfer time is substantially greater than the average transfer time.

21. A method as recited in claim 20, wherein said discarding (a3) discards those of the transfer times that substantially exceed the average transfer time.

22. A method as recited in claim 20, wherein said discarding (a3) discards those of the transfer times that are at least twice as long as the average transfer time.

23. A method for evaluating performance of a disk drive, said method comprising:

(a) obtaining an average transfer time for the disk drive, wherein said obtaining (a) includes at least (a1) performing a predetermined number of data transfers from the disk drive; (a2) determining transfer times for each of the predetermined number of data transfers being performed by said performing (a1); and (a3) averaging the transfer times to produce the average transfer time for the disk drive;

(b) transferring a first number of data blocks from the disk drive;

(c) determining a measured transfer time for the time it takes for said transferring (b) to transfer the first number of data blocks from the disk drive;

(d) determining whether the measured transfer time is substantially greater than the average transfer time; and (e) increasing a performance error count when said determining (d) determines that the measured transfer time is substantially greater than the average transfer time.

24. A method as recited in claim 23, wherein said method further comprises:

(f) repeating at least said transferring (b) through said increasing (e) for subsequent transfers of the first number of data blocks from the disk drive.

25. A method as recited in claim 24, wherein said repeating (f) continues until all the data blocks of the disk drive have undergone data transfer therefrom, and wherein said method further comprises:

(g) comparing the performance error count with a maximum count; and (h) determining whether the one of the disk drives has a deficient performance when the performance error count exceeds the maximum count.

26. A method as recited in claim 23, wherein said obtaining (a) is done empirically by measuring a transfer time over a sample size.

27. A method as recited in claim 23, wherein the performance of the disk drive being evaluated is a data throughput rate.

28. A method for evaluating performance of a disk drive, said method comprising:
(a) obtaining an average transfer time for the disk drive, wherein said obtaining (a) includes at least (a1) performing a predetermined number of data transfers from the disk drive; (a2) determining transfer times for each of the predetermined number of data transfers being performed by said performing (a1); (a3) discarding at least one of the transfer times; and (a4) averaging the transfer times that have not been discarded to produce the average transfer time for the disk drive;
(b) transferring a first number of data blocks from the disk drive;
(c) determining a measured transfer time for the time it takes for said transferring (b) to transfer the first number of data blocks from the disk drive;
(d) determining whether the measured transfer time is substantially greater than the average transfer time; and
(e) increasing a performance error count when said determining (d) determines that the measured transfer time is substantially greater than the average transfer time.

29. A method as recited in claim 28, wherein said discarding (a3) discards those of the transfer times that substantially exceed the average transfer time.

30. A method as recited in claim 28, wherein said discarding (a3) discards those of the transfer times that are at least twice as long as the average transfer time.

31. A server for streaming data, comprising:
a plurality of disk drives; and
a drive controller operatively connected to said disk drives, said drive controller controlling operation of said disk drives, obtaining data transfer time performance of each of said disk drives, comparing the data transfer time performance of each of said disk drives with minimum performance requirements, and certifying suitability of said disk drives for use in streaming data when it is determined that the data transfer time performance of each of said disk drives meets or exceeds the minimum performance requirements,
wherein said comparing of the data transfer performance with the minimum performance requirements includes at least: determining an average transfer time for at least one of said disk drives; transferring a first number of data blocks from the one of said disk drives; determining a measured transfer time for the time it takes to transfer the first number of data blocks from the one of said disk drives; determining whether the measured transfer time is substantially greater than the average transfer time; and increasing a performance error count when it is determined that the measured transfer time is substantially greater than the average transfer time.

32. A server as recited in claim 31, wherein said disk drives are configured into a RAID, and wherein said drive controller is a RAID controller.

33. A tangible computer readable medium including at least computer program code for evaluating performance of an arrangement of disk drives for streaming data, said computer readable medium comprising:
computer program code for producing an average transfer time for at least one of the disk drives, wherein said computer program code for producing operates to at least (a1) perform a predetermined number of data transfers from the one of the disk drives, (a2) determine transfer times for each of the predetermined number of data transfers, and (a3) averaging the transfer times to produce the average transfer time for the one of the disk drives;
computer program code for transferring a first number of data blocks from one of the disk drives;
computer program code for determining a measured transfer time for the time it takes for the first number of data blocks to be transferred from the one of the disk drives;
computer program code for determining whether the measured transfer time is substantially greater than the average transfer time; and
computer program code for increasing a performance error count when it is determined that the measured transfer time is substantially greater than the average transfer time.

* * * * *